US009276636B2

(12) United States Patent
Lingam et al.

(10) Patent No.: US 9,276,636 B2
(45) Date of Patent: Mar. 1, 2016

(54) ADAPTIVE MODULATION SYSTEM AND METHOD TO MINIMIZE ENERGY CONSUMPTION

(71) Applicant: Texas Instruments Incorporated, Dallas, TX (US)

(72) Inventors: Srinivas Lingam, Dallas, TX (US); Tarkesh Pande, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/586,867

(22) Filed: Dec. 30, 2014

(65) Prior Publication Data
US 2015/0358050 A1 Dec. 10, 2015

Related U.S. Application Data

(60) Provisional application No. 62/007,491, filed on Jun. 4, 2014.

(51) Int. Cl.
*H04B 15/00* (2006.01)
*H04B 3/54* (2006.01)

(52) U.S. Cl.
CPC .............. *H04B 3/544* (2013.01); *H04B 3/542* (2013.01)

(58) Field of Classification Search
USPC .................. 375/260, 285, 295–296; 370/204, 370/465–466; 455/522, 102, 68, 67.13, 455/114.2, 115.1
See application file for complete search history.

(56) References Cited

U.S. PATENT DOCUMENTS

| 7,130,587 | B2* | 10/2006 | Hikokubo et al. | 455/67.11 |
|---|---|---|---|---|
| 7,852,956 | B2* | 12/2010 | Kawasaki | 375/260 |
| 2002/0173312 | A1* | 11/2002 | Takano et al. | 455/452 |
| 2004/0136469 | A1* | 7/2004 | Wang et al. | 375/295 |
| 2005/0064890 | A1* | 3/2005 | Johan et al. | 455/522 |
| 2005/0213554 | A1* | 9/2005 | Ginzburg et al. | 370/349 |
| 2006/0246855 | A1* | 11/2006 | Kato et al. | 455/102 |
| 2008/0032726 | A1* | 2/2008 | Tajima et al. | 455/509 |
| 2011/0007790 | A1* | 1/2011 | Xu et al. | 375/225 |
| 2014/0112181 | A1* | 4/2014 | Saito | 370/252 |
| 2014/0328155 | A1* | 11/2014 | Dhanda et al. | 370/215 |

* cited by examiner

*Primary Examiner* — Khanh C Tran
(74) *Attorney, Agent, or Firm* — Lawrence J. Bassuk; Frank D. Cimino

(57) ABSTRACT

A communication device includes a modulating component, a transmitting component and a controlling component. The modulating component generates a first modulated packet and a second modulated packet. The first modulated packet is based on a first modulation scheme and the second modulated packet is based on a second modulation scheme. The first modulation scheme has a first amount of energy associated therewith, and the second modulation scheme has a second amount of energy associated therewith. The first amount of energy is less than the second amount of energy. The transmitting component generates a transmit packet based on one of the first modulated packet and the second modulated packet. The controlling component generates a control signal to instruct the modulating component to generate the first modulated packet when the transmit packet will be less than a predetermined threshold. The threshold is based on the first amount of energy.

20 Claims, 9 Drawing Sheets

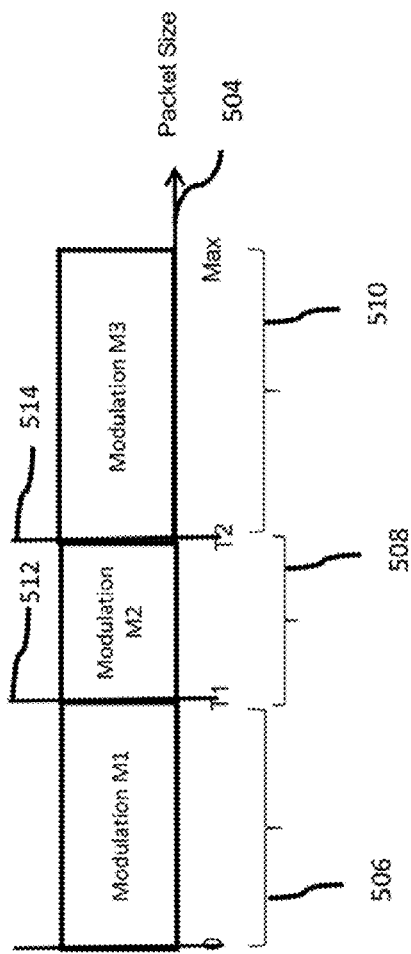
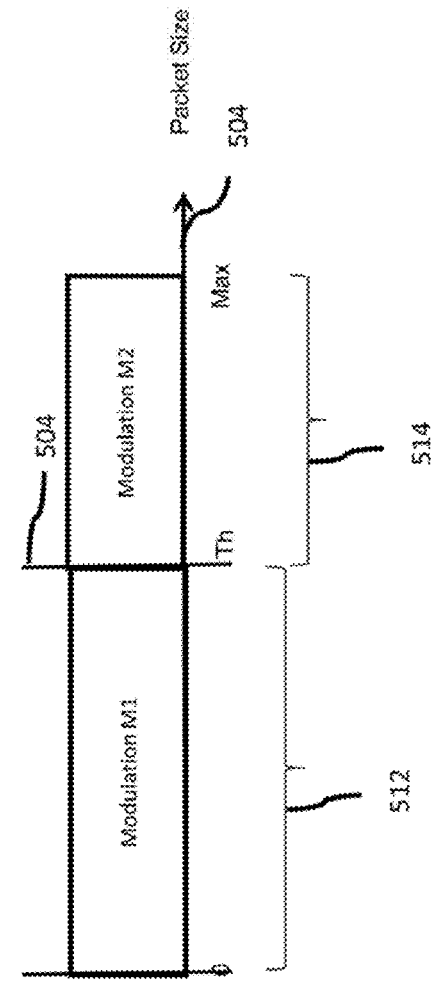

ADAPTIVE MODULATION SYSTEM AND METHOD TO MINIMIZE ENERGY CONSUMPTION

The present application claims priority from: U.S. Provisional Application No. 62/007,491 filed Jun. 4, 2014, the entire disclosure of which is incorporated herein by reference.

BACKGROUND

The present disclosure relates generally to wired and wireless communications systems for a variety of applications but with a particular emphasis on power line communications (PLC).

Link adaptation, or adaptive modulation, or adaptive modulation and coding are terms used in communications to denote the matching of the modulation, coding and other signal and protocol parameters to the conditions on the wireless or wired link, e.g. path loss, interference due to signals coming from other transmitters, the sensitivity of the receiver, the available transmitter power margin, etc. For example, in a wireless application, enhanced data rated for GSM evolution (EDGE) uses a rate adaptation algorithm that adapts the modulation and coding scheme (MCS) according to the quality of the radio channel, and thus the bit rate and robustness of data transmission. The process of link adaptation is a dynamic one and the signal and protocol parameters change as the radio link conditions change—for example in High-Speed Downlink Packet Access (HSDPA) in Universal Mobile Telecommunications System (UMTS) this can take place every 2 ms.

Power line networks, particularly, present a hostile channel for communication signals, since their fundamental purpose as the transmission of electric power at super low frequencies. Noise, multipath, selective fading and attenuation are well known properties of power line grids and they should be considered when designing Power Line Communication (PLC) systems. Particularly, random impulsive noise characterized with short durations and very high amplitudes is identified as one of the major impairments that degrade the performance of PLC systems. Orthogonal frequency division multiplexing (OFDM) is the technique of choice for PLC and has been regarded as the modulation scheme for broadband PLC by most researchers. This is because OFDM minimizes the effects of multipath and provides high robustness against selective fading.

Adaptive modulation systems invariably require some channel state information at the transmitter. This could be acquired by assuming that the channel from the transmitter to the receiver is approximately the same as the channel from the receiver to the transmitter. Alternatively, the channel knowledge can also be directly measured at the receiver, and fed back to the transmitter. Adaptive modulation systems improve rate of transmission, and/or bit or packet error rates, by exploiting the channel state information that is present at the transmitter. Adaptive modulation systems exhibit great performance enhancements compared to systems that do not exploit channel knowledge at the transmitter.

A conventional communication system will be described using FIG. 1 through FIG. 4.

FIG. 1 shows system 100, which illustrates the components of a basic two way communication system.

As shown in the figure, system 100 includes a transmitter 102 a receiver 104 and a transmission line 106.

Transmission line 106 is arranged between transmitter 102 and receiver 104. Transmitter 102 is arranged to receive signals on an input 108. Receiver 104 is arranged to send received signals on an output 110.

Transmitter 102 is operable to modulate, upconvert and transmit signals across transmission lines. Receiver 104 is operable to receive, downconvert and demodulate signals arriving on transmission lines. Transmission line 106 is operable to be the medium for propagation of communications signals between transmitters and receivers either wirelessly or using a wire.

In operation, transmitter 102 receives a signal from input 108 and modulates the signal on to a carrier frequency. Transmitter 102 may also upconvert the modulated carrier frequency to a higher frequency for transmission over transmission line 106. Receiver 104 downconverts the modulated carrier received from transmission line 106 to a lower frequency and demodulates the modulated signal for output on output 110.

A particular application of the basic transmission line system of system 100 is Power Line Communications (PLC) where power lines, used primarily to deliver electrical power, are also utilized as transmission lines for communications signals.

FIG. 2 illustrates system 200, a PLC application of system 100.

As shown in the figure, system 200 includes a generator 202, a line 204, a transmission line 206, a transmitter 208, a receiver 210, a line 212 and a line 214.

Line 204 is arranged to connect generator 202 to transmission line 206. Transmission line 206 is arranged between transmitter 208 and receiver 210 via line 212 and line 214.

Generator 202 is operable to deliver electrical power across transmission lines. Transmitter 208 is operable to modulate, upconvert and transmit signals across transmission lines. Receiver 210 is operable to receive, downconvert and demodulate signals arriving on transmission lines. Transmission line 206 is operable to be the wired medium for propagation of both electrical power and communications signals.

In operation, generator 202 is generating electrical power to transmission line 206 for distribution. At the same time, transmitter 208 modulates communications signals on to a carrier frequency. Transmitter 208 upconverts the modulated carrier frequency to a higher frequency for transmission over transmission line 206 via line 212. Receiver 210 downconverts the modulated carrier received from transmission line 206 via line 214 to a lower frequency and then demodulates the modulated signal. Modulation and demodulation, in this embodiment, may also include forward error correction (FEC) encoding and decoding.

A conventional PLC system, as illustrated by system 200, may be used in applications such as smart utility metering, automated meter reading, renewable energy communications, lighting control, electric vehicle servicing, etc. and as such may comply with the most well-known standards, namely PRIME, ITU G9903 and IEEE 1901.2. These standards address the harsh channel conditions encountered by data communications across noisy power lines. PRIME, ITU G9903 and IEEE 1901.2 use OFDM for physical layer communication. Modulation schemes used within the OFDM framework can be BPSK, ROBO/BPSK (or super ROBO), QPSK, 8-PSK, and in some cases 16-QAM. Each of these modulation schemes has a different signal-to-noise (SNR) requirement in order to satisfy a target frame-error-rate figure. The slowest data rate modulation (ROBO/BPSK) has the least stringent SNR requirement while the highest data rate (8-PSK for most systems) has the most stringent, the difference between these being as much as 15 dB.

For a conventional system, always supporting the highest data rate possible is the goal. To achieve this in a point-to-point link, the transmitter periodically sends "sounding" packets to the receiver. Using the sounding packets, the receiver estimates the SNR of the channel and communicates back to the transmitter the fastest modulation it can support given that estimate. The transmitter will then synchronously change modulations so that the highest data rate is always maintained. This method is known as 'adaptive modulation". The receiver also has the capability to send requests to the transmitter for it to adjust the transmit RF power. Increasing transmit RF power is another way of increasing the SNR, a method which can be used alongside modulation changes to maximize data rate.

FIG. 3 shows system 300, a conventional system which adapts its modulation scheme to transmission line conditions in order to maintain the highest data rate.

As shown in the figure, system 300 includes transmission line 106, a modulating component 302, a transmitting component 304, a receiving component 306, a demodulating component 308 and a modulation controller 310.

Modulating component 302 is arranged between input 108 and transmitting component 304 via a line 312. Transmitting component 304 is arranged to connect to transmission line 106 via a line 314, while receiving component 306 is arranged to connect to transmission line 106 via a line 316. Demodulating component 408 is arranged to connect between receiving component 306 via a line 320 and modulation controller 310 via a line 322. Demodulating component 308 also connects to an output 324. Modulation controller 310 connects to modulating component 302 via a line 318.

Modulating component 302 is operable to modulate input signals onto a carrier frequency. Modulating component 302 is also operable to support several modulation schemes. Modulating component 302 receives data from input 108 and creates modulated packets in accordance a modulation for which it is currently operating.

Transmitting component 304 is operable to upconvert a carrier frequency to a higher carrier frequency and to transmit a carrier over a transmission line. Transmitting component 302 modulated packets from modulating component 302 and creates transmit packets for transmission through channel 106.

Receiving component 306 is operable to receive a carrier frequency from a transmission line and to downconvert the carrier frequency to a lower carrier frequency. Demodulating component 308 is operable to demodulate a carrier frequency to provide an output signal. Demodulating component 308 is also operable to support several modulation schemes. Modulation controller 310 is operable to receive information from a demodulator and to send a control signal to a modulator.

System 300 represents the near end of a two-way communications link across a transmission line. The far end of the link duplicates the near end is also represented by system 300, but is not shown.

In operation, the data signal appearing on input 108 is modulated on to a carrier by modulating component 302 to create a stream of modulated packets. Transmitting component 304 creates a stream of transmit packets from the stream of modulated packets. Transmitting component then transmits the stream of transmit packets over transmission line 106 by transmitting component 304 to the far end receiver. Receiving component 306 receives a signal from the far end's transmitter and the signal is demodulated by demodulating component 308 and output via line 324. The output signal on line 324 is tapped off and sent to modulation controller 310 via line 322. Modulation controller sends commands to modulating component 302 via line 318.

System 300 adjusts its modulation scheme to maintain the highest data rate possible for channel 106 to achieve during operation.

In some systems, modulating component 302 knows parameters of channel 106, e.g., via a priori SNR information of channel 106. Modulation controller 310 uses the known channel SNR information to calculate the highest viable modulation scheme which can be used by the system. Modulation controller 310 then sends commands to modulating component 302 to update its modulation scheme. Thus, the highest data rate possible for the channel is always maintained during operation. In this example, transmitted RF power is maintained at a constant level, conventionally the highest level possible for the conditions (and any regulations) since this ensures the highest SNRs possible.

In some other systems, modulating component 302 sends sounding packets to the far end receiver which uses these packets to estimate the SNR of the channel sent over transmission line 106 and sends the SNR estimation back. This is received by receiving component 306 and modulation controller 310, which, since it can see the received signal, extracts the SNR information and uses it to calculate the highest viable modulation scheme which can be used by the system. Modulation controller 310 then sends commands to modulating component 302 to update its modulation scheme. Thus, the highest data rate possible for the channel is always maintained during operation. In this example, transmitted RF power is maintained at a constant level, conventionally the highest level possible for the conditions (and any regulations) since this ensures the highest SNRs possible.

Data is sent over the transmission channel using packets. Data packets can also be referred to as frames.

FIG. 4 shows an example transmit packet 400, which illustrates the basic structure of a packet sent over system 300.

As shown in the figure, transmit packet 400 includes a preamble section 402, a header section 404 and a data section 406. Transmit packet 400 corresponds to a transmit packet created by transmitting component 304.

The sections are arranged in time in the order shown in the figure with preamble section 302 being transmitted first.

Preamble section 402 is a series of bits or symbols intended to allow the far end receiver to detect the arrival of the beginning of a packet and to synchronize to it. Header section 404 is a series of bits or symbols to convey information about the packet to the far end receiver such as frame length, modulation, control check data, etc. Data section 406 is the data field intended to be transmitted. This data section corresponds to the modulated packet created by modulating component 302. As shown encompassed by a bracket 408, preamble section 402 and header section 404 are the overhead portions of the packet, and as shown by bracket 410, data section 406 is the payload portion. Conventionally, the overhead portion is of fixed length while data length can be of variable length.

Transmitting component 304 creates preamble section 402 and header section 404. Transmitting component 304 additionally adds preamble section 402 and header section 404 to data section 406 to create transmit packet.

It was stated earlier, that in order to maximize data throughput, a conventional system will tend to use the highest rate modulation scheme which is viable transmitted at the highest viable RF power. However, this basis for modulation and power selection can create problems in applications where power consumption is very important, such as in battery powered equipment applications or in other applications where available energy is limited, solar powered equipment for instance. In such systems, data throughput may have to take a back seat to energy conservation. Conventional systems, however, do not operate this way.

What is needed, therefore, is a system and method which can control modulation choice and RF transmit power based on minimizing the energy consumed by the link rather than on maximizing the data speeds.

BRIEF SUMMARY

The present disclosure provides a novel system and method for controlling modulation choice and RF transmit power based on minimizing the energy consumed by an end-to-end communications link rather than being based on increasing the data throughput.

The present disclosure is drawn to communication device includes a modulating component, a transmitting component and a controlling component. The modulating component generates a first modulated packet and a second modulated packet. The first modulated packet is based on a first modulation scheme and the second modulated packet is based on a second modulation scheme. The first modulation scheme has a first amount of energy associated therewith, and the second modulation scheme has a second amount of energy associated therewith. The first amount of energy is less than the second amount of energy. The transmitting component generates a transmit packet based on one of the first modulated packet and the second modulated packet. The controlling component generates a control signal to instruct the modulating component to generate the first modulated packet when the transmit packet will be less than a predetermined threshold. The threshold is based on the first amount of energy.

Additional advantages and novel features of the disclosure are set forth in part in the description which follows, and in part will become apparent to those skilled in the art upon examination of the following or may be learned by practice of the disclosure. The advantages of the disclosure may be realized and attained by means of the instrumentalities and combinations particularly pointed out in the appended claims.

BRIEF SUMMARY OF THE DRAWINGS

FIGS. 5A-B shows diagrams which illustrates modulation changes according to packet size thresholds for modulations;

DETAILED DESCRIPTION

Aspects of the present disclosure are drawn to controlling a transmitter's modulation to minimize energy consumption.

Another aspect of the present disclosure is drawn to determining the amount of energy available at the transmitter side and/or the receiver side, well as information on channel conditions to control modulation choice based on minimizing the energy consumption.

The aspects listed above together represent unique and novel systems and methods which utilize adaptive modulation to minimize the energy consumed. Since, as will be shown, higher data rates can use significantly more energy, the flexibility to do this when available power is in short supply can be a significant. It is usually far preferable to keep a link operating more at a lower speed than for the link to be at risk of failing.

Figure 1:
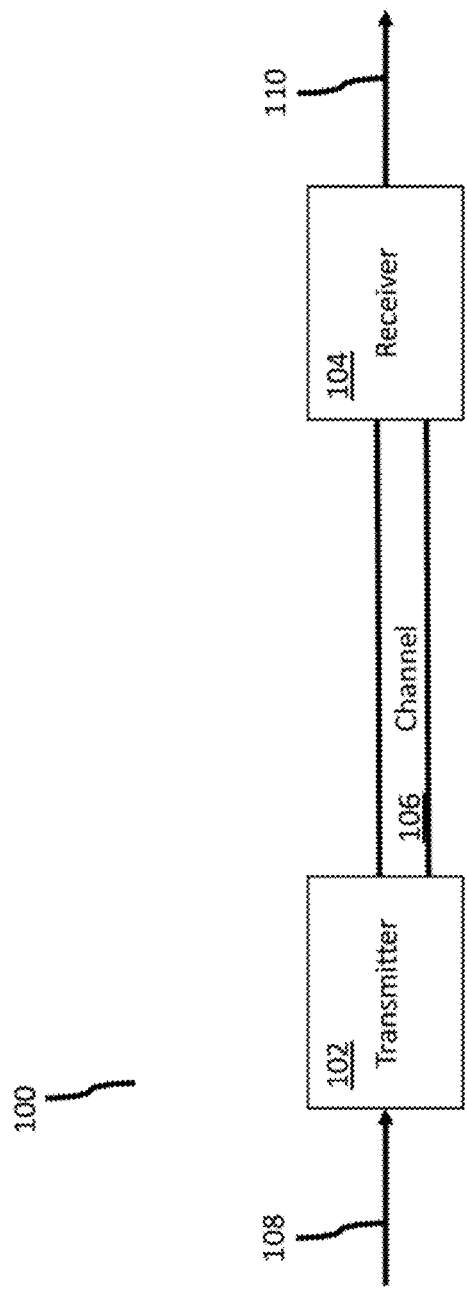
FIG. 1 illustrates the components of a basic one-way transmission line system.
Figure 2:
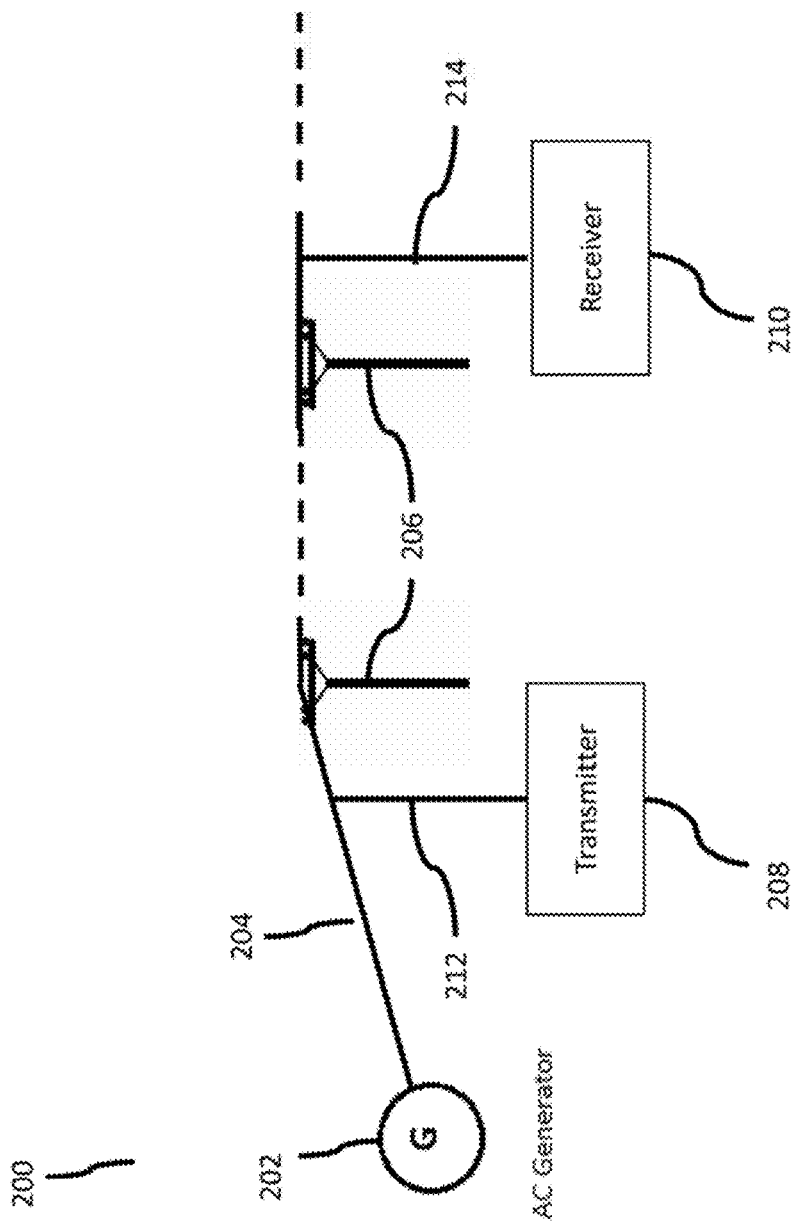
FIG. 2 illustrates a PLC application of system FIG. 1.
Figure 3:
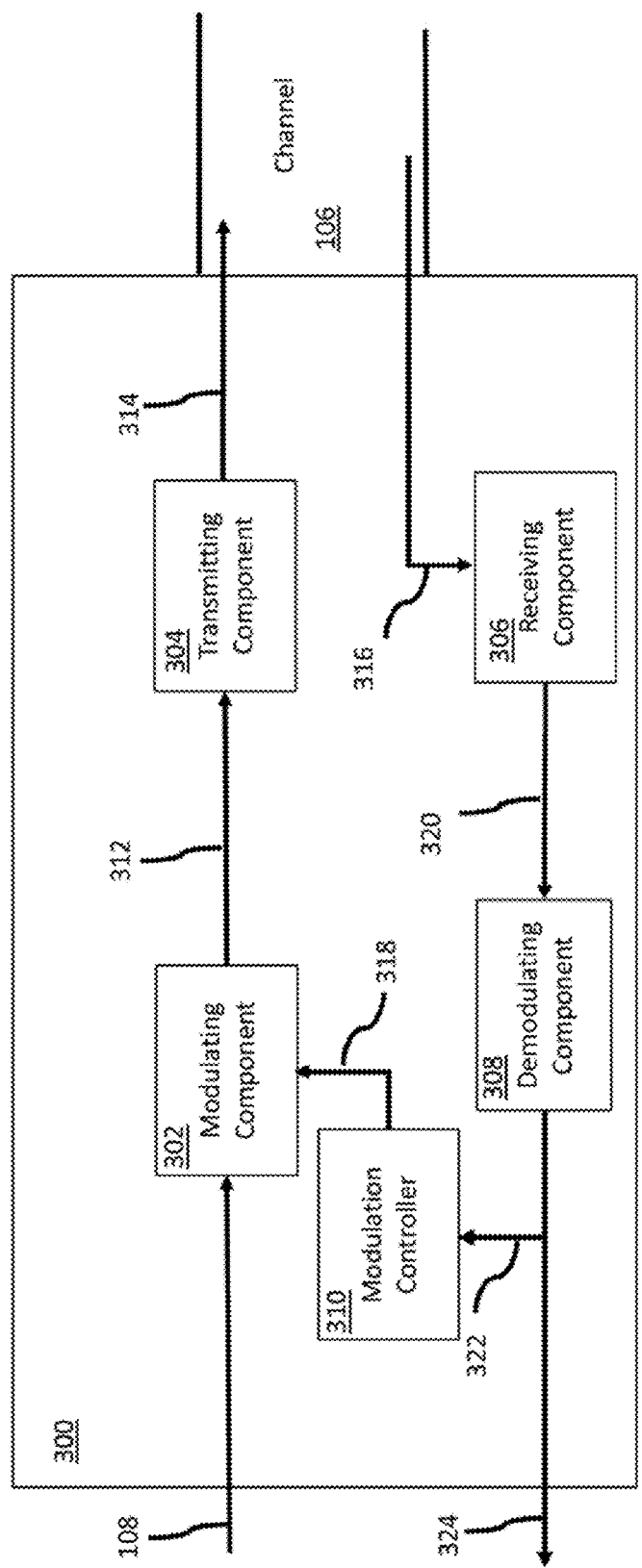
FIG. 3 illustrates a conventional system, which adapts its modulation scheme to transmission line conditions in order to maintain the highest data rate.
Figure 4:
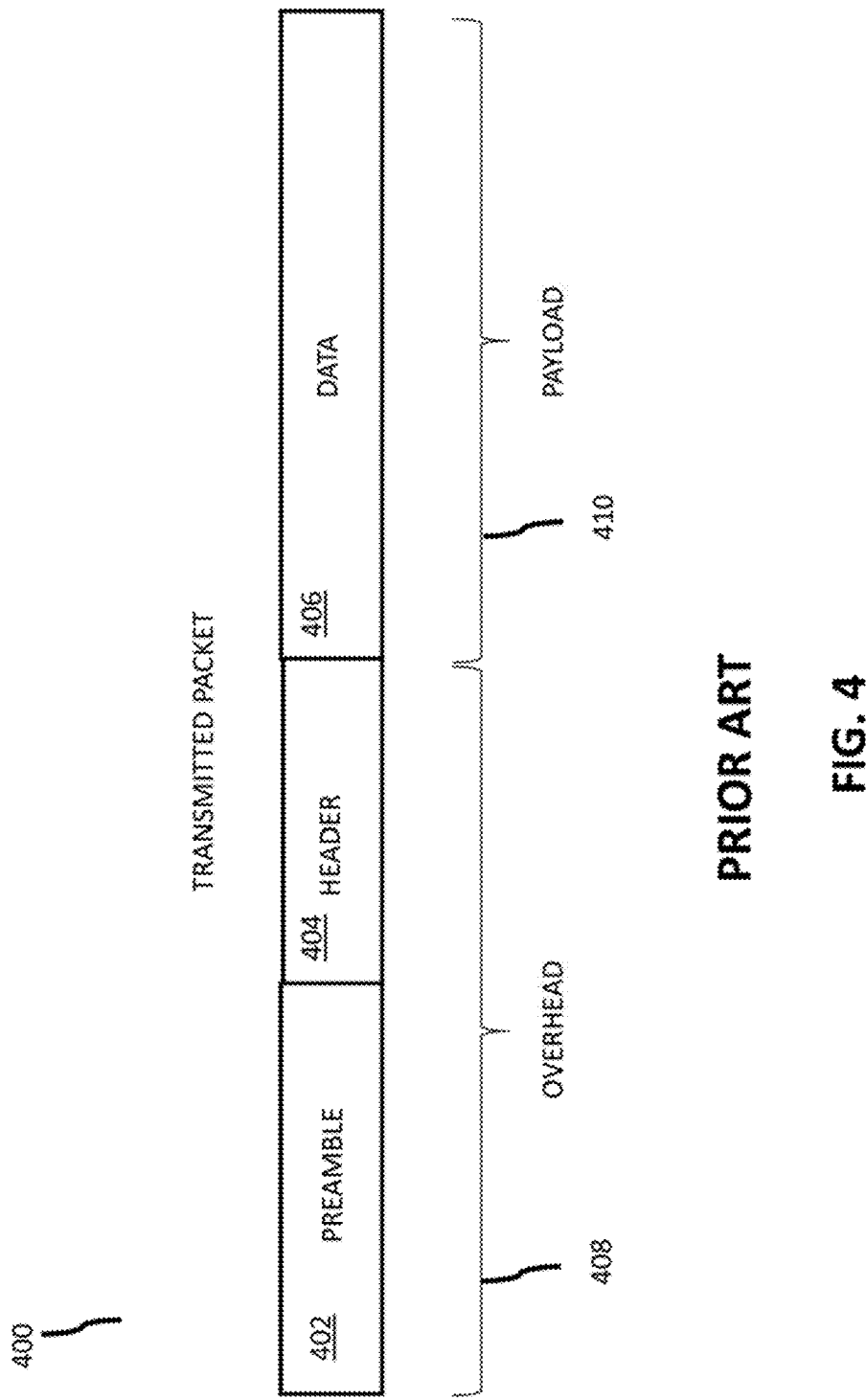
FIG. 4 an example transmit packet to be sent over a transmission line system.

Referring briefly back to FIG. 4, packets have a fixed overhead portion and a variable payload (data) portion. For small packets, i.e. packets with smaller data fields, the overhead can be a large proportion of what needs to be transmitted. For such cases, since higher speed modulations consume more energy than lower speed modulations, a large amount of energy can be expended to send a small amount of data across link at high speed.

In accordance with aspects of the present disclosure, it may therefore advantageous in applications where energy is more important than speed, to choose modulations based on the packet size.

Considering the energy requirements for packet sizes transmitted over a point-to-point link that can support two modulations, $M_1$ and $M_2$, and for which both modulations can support a packet, the energy consumed for the packet using $M_1$ is shown in equation (1) and using $M_2$ is shown in equation (2), as follows;

$$E_1 = P_1 * T_1, \qquad (1)$$

$$E_2 = P_2 * T_2, \qquad (2)$$

where $P_1$ and $P_2$ are the power consumed and $T_1$ and $T_2$ are the on-air times for the packets. A modulation choice in accordance with the present disclosure is based on minimizing $E_1$ and $E_2$.

Separating the contributions to $P_1$ and $P_2$ by the transmit and receive portions of the link equipment and by the digital baseband and analog front end portions, the energy calculations for $M_1$ become shown in equation (3) and for $M_2$ become shown in equation (4), as follows:

$$E_1 = (P_{TxBaseband1} + P_{RxBaseband1} + P_{TxAFE1} + P_{RxAFE1}) * T_1 \qquad (3)$$

$$E_2 = (P_{TxBaseband2} + P_{RxBaseband2} + P_{TxAFE2} + P_{RxAFE2}) * T_2, \qquad (4)$$

where $P_{TxBaseband}$ and $P_{RxBaseband}$ refers to the power consumed by the baseband circuits for transmission and reception, respectively and where $P_{TxAFE}$ and $P_{RxAFE}$ refers to the power consumed by the analog front end paths for transmission and reception, respectively. The dominant contribution is usually $P_{TxAFE}$ since most power is consumed by the line driver or power amplifier in the transmit circuit.

So, in addition to the SNR of the channel ($SNR_{channel}$), $P_{TxBaseband}$, $P_{RxBaseband}$, $P_{TxAFE}$, $P_{RxAFE}$ can also be considered in the choice in accordance with aspects of the present disclosure.

In one embodiment in accordance with aspects of the present disclosure, the receiver makes the modulation decisions using $SNR_{channel}$ and has access to $P_{TxBaseband}$ and $P_{TxAFE}$, information. If multiple choices result, it may use $P_{TxBaseband}$ and $P_{TxAFE}$ to refine the choice and to calculate the power back-off or increases necessary to minimize energy.

In another embodiment in accordance with aspects of the present disclosure, the transmitter makes the modulation decisions using $SNR_{channel}$ information received from the receiver and, by also having access to $P_{RxBaseband}$ and $P_{RxAFE}$, information from the receiver for any multiple choices, can use this information not only to refine the modulation choice but to calculate an appropriate power back-off.

In another embodiment in accordance with aspects of the present disclosure, the modulation is chosen based on packet size. This method specifies the lower possible modulation for packet sizes less than a threshold and the higher possible modulation for packet sizes larger than the threshold. The threshold is dependent on the transmit energy used in the transmission of the total packet, or the total power consumption at the receiver, or some combination of these, or some weighted combination of these.

Aspects of the present disclosure will now be described in greater detail with reference to FIGS. 5-10.

FIG. 5A shows diagram 500, which illustrates modulation changes according to packet size thresholds for three modulations.

As shown in the figure, diagram 500 includes an x-axis 504, a modulation range 506, a modulation range 508 and a modulation range 510.

X-axis 504 represents packet size.

The figure illustrates an embodiment in which transmit packets between a packet size of zero and a packet size up to a threshold $T_1$, as indicated by modulation range 506, are transmitted with modulation $M_1$. Transmit packets with a packet size between threshold $T_1$ and threshold $T_2$ use modulation $M_2$ as indicated by modulation range 508. Similarly, transmit packets with a packet size between thresholds greater than $T_2$ use modulation $M_3$ as indicated by modulation range 510.

In accordance with aspects of the present disclosure, the figure illustrates how modulations are chosen from the three available with respect to thresholds set for transmit packet size.

In other embodiments, there may be more or there may be fewer modulations from which to choose.

FIG. 5B shows diagram 502, which illustrates modulation changes according to transmit packet size thresholds for two modulations.

As shown in the figure, diagram 502 includes x-axis 504, a modulation range 512 and a modulation range 514.

Modulation range 512 indicates that modulation $M_1$ is chosen for transmit packet sizes less than the threshold, $T_h$, and modulation range 514 shows that modulation $M_2$ is chosen for transmit packet sizes greater than $T_h$.

A particular modulation scheme will have a total transmit energy associated therewith, based on the size of the original data packet. As the data packet size increases, the transmit energy for a particular modulation scheme will additionally increase. However, the rate at which the transmit energy increases as a function of packet size differs from one modulation scheme to another. Further, a baseline transmit energy for a packet size differs from one modulation scheme to the next. The relationship between rates of change of transmit energy per packet size for modulation schemes and the relationship between baseline transmit energies for packet sizes per modulation will now be described with reference to FIG. 6.

Figure 6:
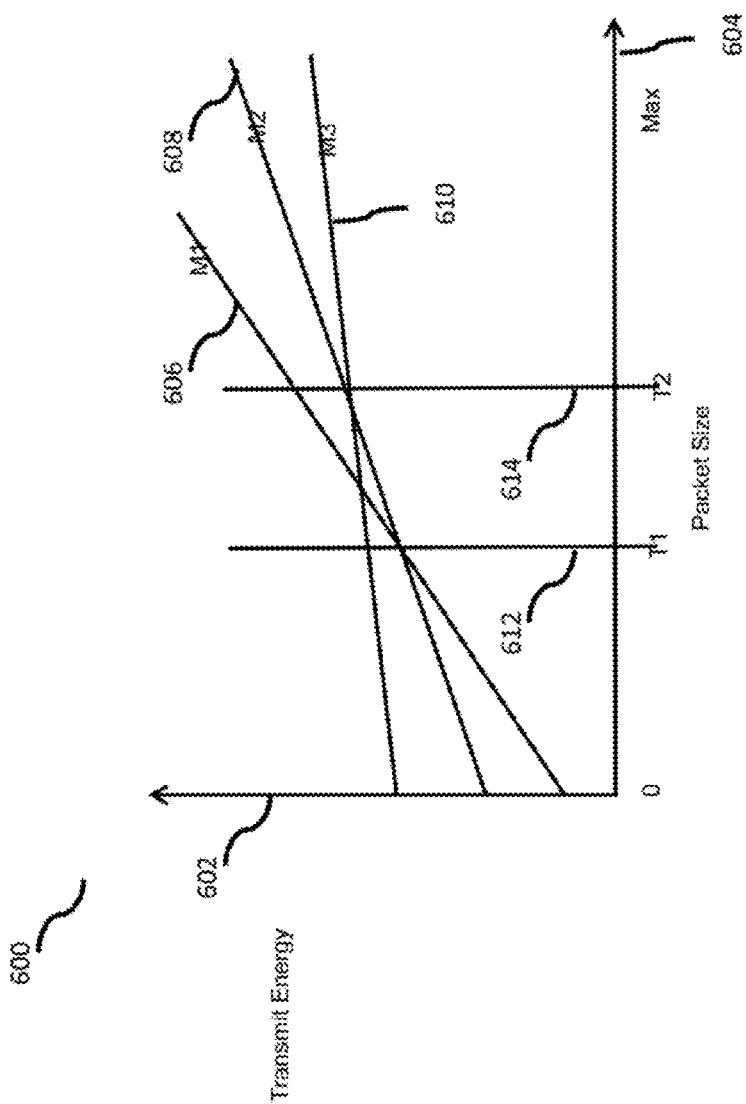
FIG. 6 shows a diagram illustrating a criterion used to set threshold values of packet size in accordance with aspects of the present disclosure.

FIG. 6 shows diagram 600 illustrating a criterion used to set threshold values of packet size in accordance with aspects of the present disclosure, As shown in the figure, diagram 600 includes a y-axis 602, an x-axis 604, a line 606, a line 608, a line 610 a threshold 612 and a threshold 614.

Y-axis 602 represents transmit energy, x-axis 604 represents packet size. Line 606 represents the transmit energy required to create and transmit a transmit packet as a function of the size of the transmit packet for modulation $M_1$. Line 608 represents the transmit energy required to create and transmit a transmit packet as a function of the size of the transmit packet for modulation $M_2$. Line 610 represents the transmit energy required to create and transmit a transmit packet as a function of the size of the transmit packet for modulation $M_3$. The slopes of lines 606, 608 and 610 are derived from the $E_M = P*T$ of equations (1) and (2).

The figure illustrates that the lowest energy modulation for packet sizes below $T_1$ (threshold 612) is $M_1$. In particular, line 606 has the lowest energy in this region. Further, the lowest energy modulation for packet sizes between $T_1$ (threshold 612) and $T_2$ (threshold 614) is $M_2$. In particular, line 608 has the lowest energy in this region. Finally, the lowest energy modulation for packet sizes above $T_2$ (threshold 614) is $M_1$. In particular, line slope 610 has the lowest energy in this region.

For lower speed modulations as compared to higher speed modulations, power is reduced but on-air time is increased. However, the overall energy requirement is also reduced. This will be further described with reference to FIG. 7.

Figure 7:
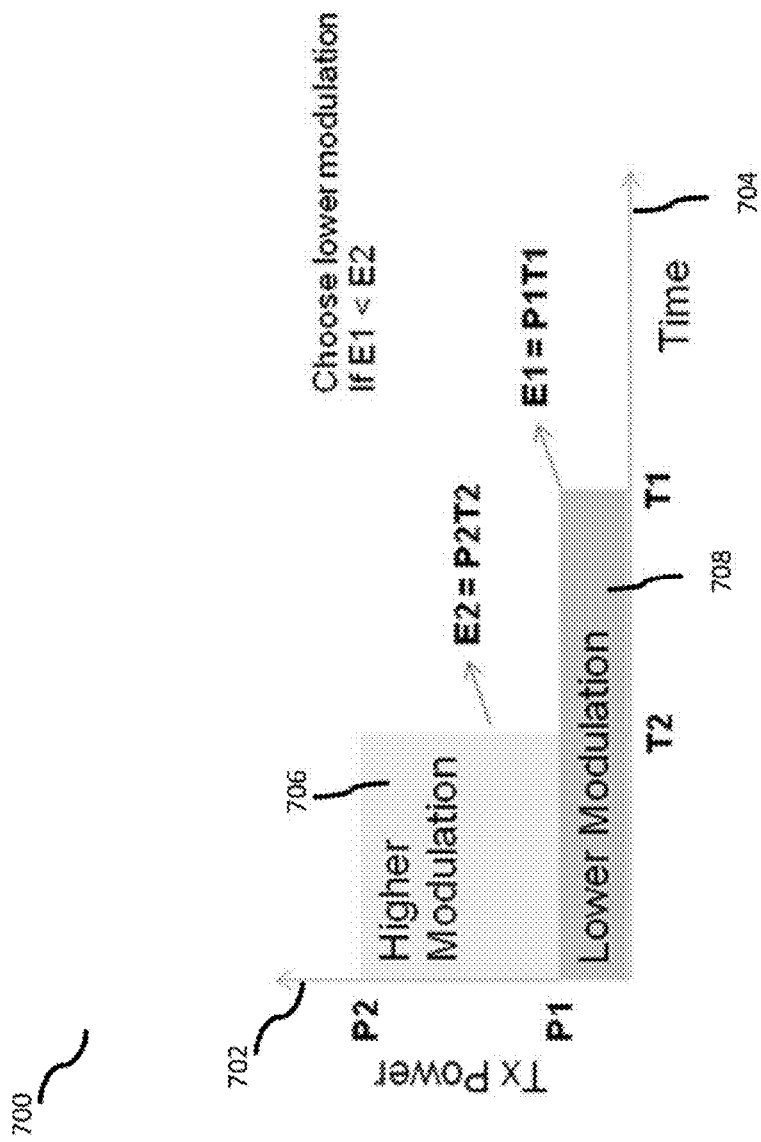
FIG. 7 illustrates the power/on-air time relationship for a higher and a lower speed modulation.

FIG. 7 shows diagram 700, which illustrates the power/on-air time relationship for a higher and a lower speed modulation.

As shown in the figure, diagram 700 includes a y-axis 702, an x-axis 704, a higher modulation region 706 and a lower modulation region 708.

Y-axis 702 represent transmit power. X-axis 704 represents on-air time.

It can be seen from the figure that higher modulation region 706 has a higher transmit power and a lower on-air time, and that lower modulation region 708 has a lower transmit power and a higher on-air time. The diagram also illustrates that the area in higher modulation region 706 is larger than the area in lower modulation region 708. Since energy (E=P*T) is proportional to the area of the modulation region, the lower modulation has a lower energy requirement.

Example embodiments of a transmitter in accordance with aspects of the present disclosure will now be described with additional reference to FIGS. 8-9.

Figure 8:
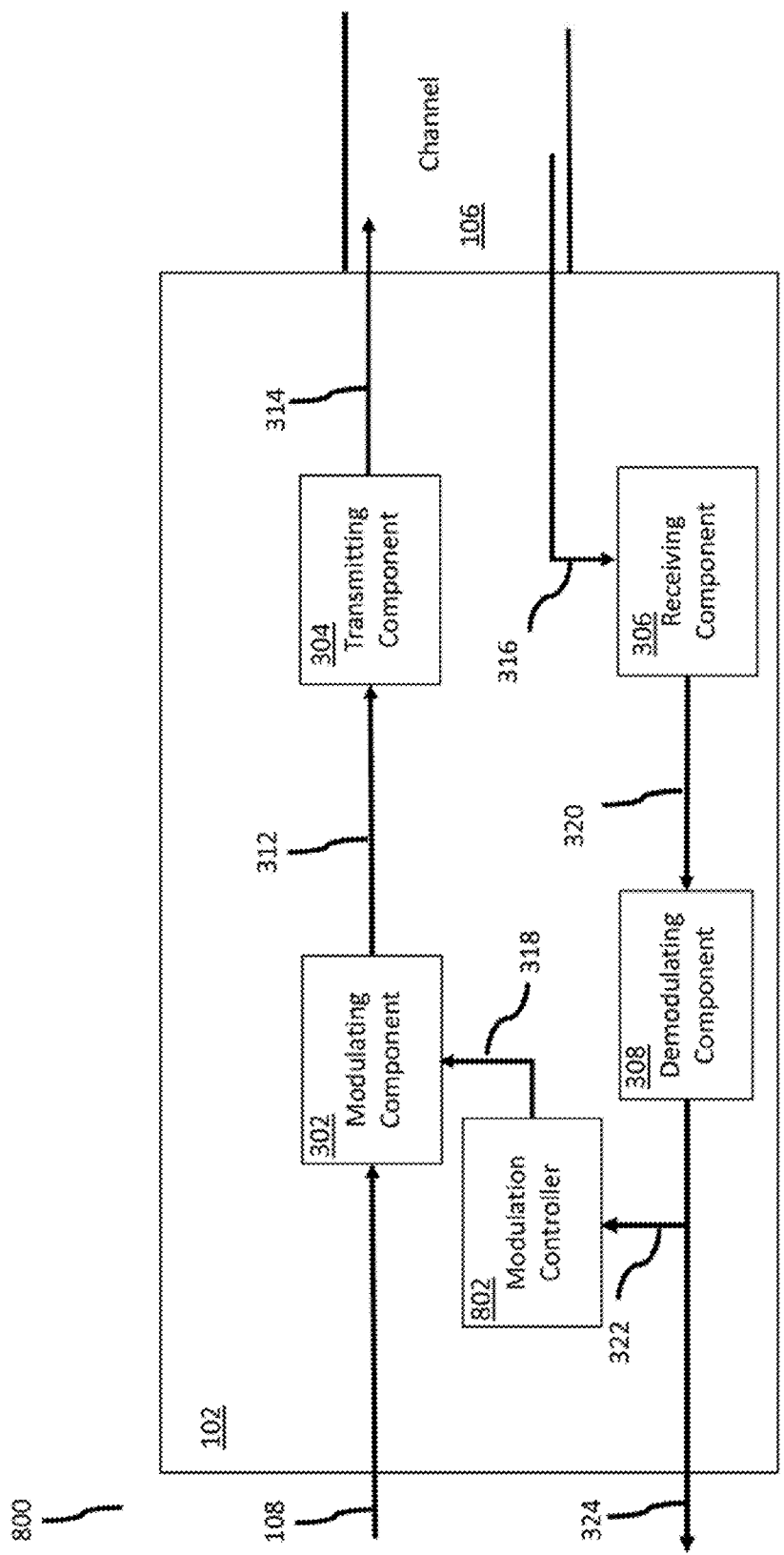
FIG. 8 shows a block diagram of one end of a two-way link operating in accordance with aspects of the present disclosure.

FIG. 8 shows system 800, one end of a two-way link in accordance with aspects of the present disclosure.

As shown in the figure, system 800 includes transmission line 106, modulating component 302, transmitting component 304, receiving component 306, demodulating component 308 and a modulation controller 802.

Demodulating component 308 is arranged to connect to modulation controller 802 via line 322. Modulation controller 802 connects to modulating component 302 via line 318.

In this embodiment, modulating component 302, transmitting component 304, receiving component 306, demodulating component 308 and modulation controller 802 are implemented as distinct elements. However, in some embodiments, at least two of modulating component 302, transmitting component 304, receiving component 306, demodulating component 308 and modulation controller 802 may be implemented as a unitary element. Further, in some embodiments, at least one of modulating component 302, transmitting component 304, receiving component 306, demodulating component 308 and modulation controller 802 may be implemented as non-transient, tangible computer-readable media for carrying or having computer-executable instructions or data structures stored thereon. Such non-transient, tangible computer-readable media can be any available media that can be accessed by a general purpose or special purpose computer. Non-limiting examples of non-transient, tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (hardwired and/or wireless, or a combination of hardwired or wireless) to a computer, the computer properly views the connection as a non-transient, tangible computer-readable media computer-medium. Thus, any such connection is properly termed a non-transient, tangible computer-readable medium. Combinations of the above should also be included within the scope of non-transient, tangible computer-readable media.

Modulation controller 802 is operable to receive information from a demodulator and to send a control signal to a modulator.

System 800 represents the near end of a two-way communications link across a transmission line. The far end of the link duplicates the near end is also represented by system 800, but is not shown.

System 800 differs from system 300 discussed above in that modulation controller 802 of system 800 operates differently from modulation controller 310 of system 300. In particular, modulation controller 802 controls modulating component 302 to generate a modulated packet when the transmit packet will be less than a predetermined threshold, such that the threshold is based on an amount of energy.

In operation, the data signal appearing on input 108 is modulated on to a carrier by modulating component 302 and is transmitted over transmission line 106 by transmitter 304 to the far end receiver. Receiving component 806 receives a signal from the far end's transmitter and the signal is demodulated by demodulating component 808 and output via line 324. The output signal on line 324 is tapped off and sent to modulation controller 802 via line 322. Modulation controller sends commands to modulating component 302 via line 818.

In some embodiments, modulation controller 802 knows parameters of channel 106, e.g., via a priori SNR information of channel 106. Modulation controller 802 uses the a priori SNR information to calculate the modulations that can meet the SNR requirements. Modulation controller 802 chooses the modulation scheme based on packet size using packet size thresholds based on predetermined energy consumption information, as discussed above with reference to FIGS. 5-6. Modulation controller 802 then sends commands to modulating component 302 to update its modulation scheme as needed. Thus, the most energy efficient data rate possible for the channel is always maintained during operation.

In some embodiments, modulating component 302 creates packets for transmission to the far end receiver (not shown), which then uses these packets to estimate the SNR of the channel sent over transmission line 106. The far end receiver then sends the SNR estimation back. This is received by receiving component 306 and is used by modulation controller 802, which, since it can see the received signal, extracts the channel SNR information and detects packet sizes. Modulation controller 802 uses the collected information to calculate the modulations that can meet the SNR requirements. From the possible modulations, modulation controller 802 again chooses the modulation scheme based on packet size using packet size thresholds based on predetermined energy consumption information, as discussed above with reference to FIGS. 5-6. Modulation controller 802 then sends commands to modulating component 302 to update its modulation scheme accordingly.

By selecting a modulation scheme based on a minimized power consumption, a transmitter in accordance with aspects of the present disclosure will conserve power.

In another embodiment, additional components allow monitoring and additional calculation and control capability. This will be described with additional reference to FIG. 9.

Figure 9:
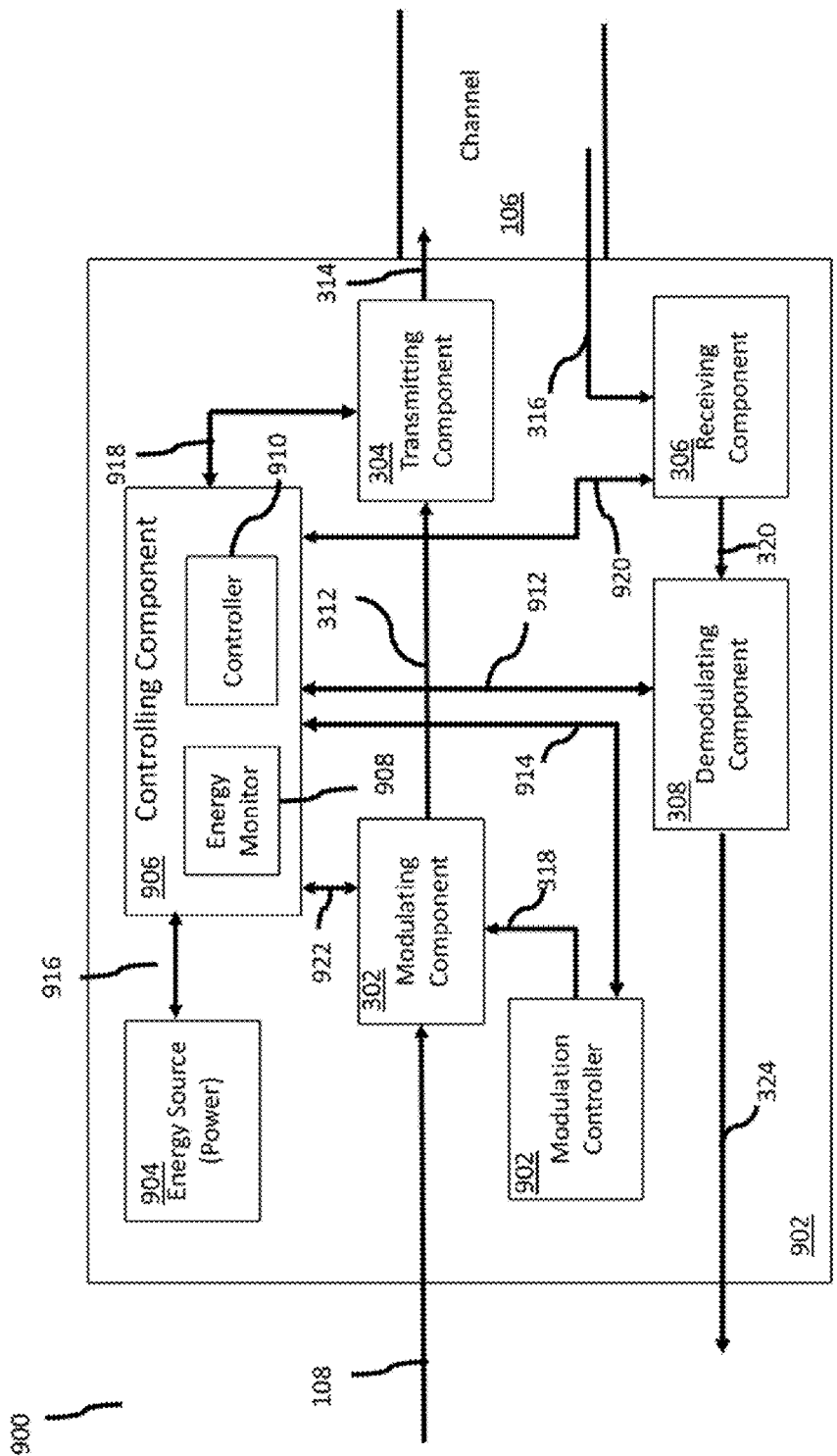
FIG. 9 shows an embodiment operating in accordance with aspects of the present disclosure with additional components for power monitoring and for control.

FIG. 9 shows system 900, an embodiment in accordance with aspects of the present disclosure with additional components for power monitoring and for control.

As shown in the figure, system 900 includes transmission line 106, modulating component 302, transmitting component 304, receiving component 306, demodulating component 308, a modulation controller 902, an energy source 904 and a controlling component 906. Controlling component 906 includes an energy monitor 908 and a controller 910.

In this embodiment, modulating component 302, transmitting component 304, receiving component 306, demodulating component 308, modulation controller 902, energy source 904 and controlling component 906 are implemented as distinct elements. However, in some embodiments, at least two of modulating component 302, transmitting component 304, receiving component 306, demodulating component 308, modulation controller 902, energy source 904 and controlling component 906 may be implemented as a unitary element. Further, in some embodiments, at least one of modulating component 302, transmitting component 304, receiving component 306, demodulating component 308, modulation controller 902 and controlling component 906 may be implemented as non-transient, tangible computer-readable media for carrying or having computer-executable instructions or data structures stored thereon.

In this embodiment, energy monitor 910 and controller 912 are implemented as distinct elements. However, in some embodiments, energy monitor 910 and controller 912 may be implemented as a unitary element. Further, in some embodiments, at least one of energy monitor 910 and controller 912 may be implemented as non-transient, tangible computer-readable media for carrying or having computer-executable instructions or data structures stored thereon.

Demodulating component 308 is arranged to connect to controlling component 906 via a line 912. Modulation controller 902 connects to modulating component 302 via line 318 and connects to controlling component via a line 914. Controlling component 906 is additionally connected to energy source 904 via a line 916, to transmitting component 304 via a line 918, to receiving component 306 via a line 920 and to modulating component 302 via a line 922.

Modulation controller 902 differs from modulation controller 802 of FIG. 8 in that modulation controller 902 is able to control modulating component 302 based on instructions from controlling component 906. Energy source 904 is operable to provide power to system 900.

Controlling component 906 is operable to monitor energy consumption via energy monitor 908, to extract messages from a received signal via energy monitor 908, and to control modulation selection via controller 910.

In some embodiments, energy monitor 908 is able to monitor energy consumption of each of modulating component 302, transmitting component 304, receiving component 306, demodulating component 308 and modulating controller 902 via lines 922, 918, 920, 912 and 914, respectively. Energy monitor 908 may monitor energy consumption in real time.

Further, in some embodiments, energy monitor 908 may have a priori energy consumption information stored therein.

Such a priori energy consumption information includes the energy consumption for each of modulating component 302, transmitting component 304, receiving component 306, demodulating component 308 and modulating controller 902 when operating to create and transmit a transmit packet as a function of any one of the size of the data packet, the size of the modulated packet and/or the size of the transmit packet.

In some embodiments, energy monitor 908 may be able to predict energy consumption for each of modulating component 302, transmitting component 304, receiving component 306, demodulating component 308 and modulating controller 902 to create and transmit a transmit packet for a specific sized data packet based on previous performance.

In operation, modulating component 302, transmitting component 304, receiving component 806, demodulating component 808 and modulation controller 902 perform similar transmit, receive and modulation switching functions as described in system 800 as discussed above with reference for FIG. 8, except that modulation controller 902 is commanded to switch to a specified modulation by controlling component 906.

In some embodiments, modulation controller 902 knows parameters of channel 106, e.g., via a priori SNR information of channel 106. Modulation controller 902 uses the a priori SNR information to calculate the modulations that can meet the SNR requirements. In other embodiments, messages from the far end station, having been demodulated at demodulating component 808, are now sent to and extracted by controlling component 906. These messages contain information about the channel SNR and energy consumption at the receiver.

Either with a priori SNR information or by way of signals from a receiver, controlling component 906 can determine the highest modulation scheme supported by channel 106. A determination is then made as to what modulation scheme should be used.

In the example embodiment discussed above with reference to FIG. 8, a modulation scheme is chosen to minimize energy consumption. In this embodiment, the decision to minimize energy consumption may be made after either one of: 1) the amount of energy within energy source 904 falls below a predetermined threshold; and/or 2) the amount of energy within an energy source (not shown) in the receiver (not shown) falls below a predetermined threshold.

For example, in some embodiments, controlling component 906 monitors the status of energy source 904 (e.g. battery charge state) and monitors the power consumption of the various components of system 900 for packets of different size and transmitted at different modulations. Controlling component 906 may instruct modulation controller 902 to instruct modulating component 302 to create modulated packets in the highest modulation scheme—by default. Then, if at some point, energy monitor 908 determines that the energy stored in energy source 904 is below a predetermined threshold, controller 910 may then instruct modulation controller 902 to instruct modulating component 302 to create modulated packets in the most energy efficient modulation scheme as discussed above with reference to FIGS. 6-7.

In effect, controlling component 906 gathers energy consumption data under various conditions and makes the necessary calculations which determine the transmit energy required to create and transmit a transmit packet as a function of the size of the transmit packet for a particular modulation, such as those illustrated in FIG. 6. From these calculations, controlling component 906 determines the packet size thresholds used for determining the modulation choice for different packet sizes. Controlling component 906 may also use predetermined energy information or thresholds.

Further, in some embodiments, controlling component 906 monitors the status of an energy source (e.g. battery charge state) of the receiver (not shown). Again, for purposes of discussion, let controlling component 906 instruct modulation controller 902 to instruct modulating component 302 to create modulated packets in the highest modulation scheme—by default. Then, at some point, receiving component 306 receives information about energy consumption at the receiver including the status of the far-end energy source (e.g. battery charge state, if a battery is the far-end energy source). Receiving component 306 provides the receiver's energy information to controlling component 906 via line 920. If energy monitor 908 determines that the energy of the receiver is below a predetermined threshold, controller 910 may then instruct modulation controller 902 to instruct modulating component 302 to create modulated packets in the most energy efficient modulation scheme as discussed above with reference to FIGS. 6-7.

In effect, the receiver (not shown) at the other end of channel 106 is telling system 900 that, "my power is running low and if you continue to transmit at the highest modulation rate,—even though the channel can support it—my power is going to run out faster than I would like." Controlling component 906 may then instruct modulation controller 902 to instruct modulating component 302 to adjust the modulation scheme to help the receiver conserve power.

Still further, in some embodiments, controlling component may instruct modulation controller 902 to instruct modulating component 302 to adjust the modulation scheme based on both the energy in energy source 904 and the energy of the receiver.

The embodiment in accordance with the present disclosure described above is not intended to be limiting.

In one example embodiment, controlling component 906 may always set modulations in order to minimize energy consumption at both ends of the link.

In another example embodiment in accordance with the present disclosure, controlling component 906 may initially set modulations for best data speed and continue to do so until it detects that the far-end power source (e.g. battery) capacity falls below a predetermined level under which conditions it starts choosing modulations for minimum energy consumption at the far end or at both ends.

In another example embodiment in accordance with the present disclosure, controlling component 906 may initially set modulations for best data speed and continue to do so until it detects that the near-end power source capacity falls below a predetermined level under which conditions it starts choosing modulations for minimum energy consumption at the near end or at both ends.

In another example embodiment in accordance with the present disclosure, controlling component 906 may initially set modulations for best data speed and continue to do so until it detects that both the near-end and far-end power source capacities have fallen below a predetermined level under which conditions it starts choosing modulations for minimum energy consumption at both ends.

In another example embodiment in accordance with the present disclosure, controlling component 906 may initially set modulations for best data speed and continue to do so until it detects that one or both the near-end and far-end power source capacities have fallen below a predetermined level under which conditions it starts choosing modulations which are optimized for a compromise between data speed and energy consumption. For instance, in a solar powered application, it is predictable that restoration of the available energy will be resumed during daylight hours after having been depleted at night, and a data speed which is higher than the most energy efficient is known to be acceptable for a limited time.

In other example embodiments in accordance with the present disclosure, system 900 may send to and receive from a plurality of far-end stations. In such embodiments, controlling component 906 may set modulations differently on a packet-by-packet basis according to their destination and the conditions and status at those destinations.

In embodiments in accordance with the present disclosure where FEC encoding and decoding is employed, the coding is considered to be part of the modulation scheme and the coding choice is considered to be part of the modulation scheme choice.

It has been explained how conventional systems which employ adaptive modulation do so with the goal of using the fastest possible data rate in order to maximize data throughput and that they may control RF power accordingly also. It has been explained that, in accordance with aspects of the present disclosure, adaptive modulation may also be used with a different goal in mind, that of minimizing power consumption and that this can be a very important factor when running equipment on battery power or other limited energy source.

A unique system in accordance with aspects of the present disclosure has been described, including how it operates (unlike conventional systems) by setting thresholds based on packet size to select from a set of viable modulation schemes, the selection having the goal of minimizing energy consumption.

Various novel embodiments have been introduced which allow operation in accordance with aspects of the present disclosure when subsets of power consumption information is available. For instance, when only one of transmit side power consumption and receive side power consumption is available, or when only one of near-end station and far-end station power consumption information is known.

Other novel embodiments have also been introduced and described which extend the flexibility of the present disclosure even further. These include: the use of modulation switching criteria which may be a compromise between best data speed and minimum power consumption; using the charge state of a battery or another limited energy source to ascertain when link optimization should change between best data speed and minimum energy; asymmetric and multiple station operation.

What is claimed as new and desired to be protected by Letters Patent of the United States is:

1. A communication device comprising:
   a modulating component operable to generate a first modulated packet and a second modulated packet, the first modulated packet being based on a first modulation scheme, the second modulated packet being based on a second modulation scheme, the first modulation scheme having a first amount of energy associated therewith, the second modulation scheme having a second amount of energy associated therewith, the first amount of energy being less than the second amount of energy;
   a transmitting component connected to the modulating component, the transmitting component operable to generate a transmit packet based on one of the first modulated packet and the second modulated packet, and
   a controlling component connected to the modulating component, the controlling component operable to generate a control signal to instruct the modulating component to generate the first modulated packet when the energy of the transmit packet will be less than a predetermined threshold, in which the threshold is based on the first amount of energy.

2. The communication device of claim 1,
   in which the modulating component is further operable to generate a third modulated packet based on a third modulation scheme having a third amount of energy associated therewith, the second amount of energy being less than the third amount of energy,
   in which the controlling component is further operable to generate the control signal to instruct the modulating component to generate the second modulated packet when the transmit packet will be greater than the predetermined threshold and less than a second predetermined threshold, and
   in which the transmitting component is further operable to transmit the transmit packet based on the third modulated packet.

3. The communication device of claim 2, including:
   a power detecting component operable to generate a detected power signal based on an amount of accessible power,
   in which the controlling component is further connected to the power detecting component, the controlling component is further operable to generate the control signal to instruct the modulating component to generate one of the first modulated packet or the second modulated packet based on the detected power signal.

4. The communication device of claim 3, including:
   a receiving component operable to receive a communication signal having power information therein based on a second amount of accessible power of a second device,
   in which the controlling component is further connected to the receiving component, the controlling component is further operable to generate the control signal to instruct the modulating component to generate one of the first modulated packet or the second modulated packet based on the communication signal.

5. The communication device of claim 4, in which the transmitting component is further operable to transmit the one of the first modulated packet and the second modulated packet in accordance with one of PRIME, ITU G9903 and IEEE 1901.2.

6. The communication device of claim 1, including:
   a power detecting component operable generate a detected power signal based on an amount of accessible power,
   in which the controlling component is further connected to the power detecting component, the controlling component is further operable to generate the control signal to instruct the modulating component to generate one of the first modulated packet or the second modulated packet based on the detected power signal.

7. The communication device of claim 6, including:
   a receiving component operable to receive a communication signal having power information therein based on a second amount of accessible power of a second device,
   in which the controlling component is further operable to generate the control signal to instruct the modulating component to generate one of the first modulated packet or the second modulated packet based on the communication signal.

8. The communication device of claim 7, in which the transmitting component is further operable to transmit the one of the first modulated packet and the second modulated packet in accordance with one of PRIME, ITU G9903 and IEEE 1901.2.

9. The communication device of claim 1, including:
a receiving component operable to receive a communication signal having power information therein based on a second amount of accessible power of a second device,
in which the controlling component is further connected to the receiving component, the controlling component is further operable to generate the control signal to instruct the modulating component to generate one of the first modulated packet or the second modulated packet based on the communication signal.

10. The communication device of claim 1, in which the transmitting component is further operable to transmit the one of the first modulated packet and the second modulated packet in accordance with one of PRIME, ITU G9903 and IEEE 1901.2.

11. A communication method comprising:
generating, via a modulating component, one of a first modulated packet and a second modulated packet, the first modulated packet being based on a first modulation scheme, the second modulated packet being based on a second modulation scheme, the first modulation scheme having a first amount of energy associated therewith, the second modulation scheme having a second amount of energy associated therewith, the first amount of energy being less than the second amount of energy;
transmitting, via a transmitting component, a transmit packet based on the one of the first modulated packet and the second modulated packet; and
generating, via a controlling component, a control signal to instruct the modulating component to generate the first modulated packet when the energy of the transmit packet will be less than a predetermined threshold,
in which the threshold is based on the first amount of energy.

12. The communication method of claim 11,
in which the generating, via a modulating component, one of a first modulated packet and a second modulated packet includes generating one of the first modulated packet, the second modulated packet and a third modulated packet, the third modulated packet being based on a third modulation scheme having a third amount of energy associated therewith, the second amount of energy being less than the third amount of energy,
in which generating, via a controlling component, a control signal to instruct the modulating component to generate the first modulated packet when the transmit packet will be less than a predetermined threshold includes generating the control signal to instruct the modulating component to generate the second modulated packet when the transmit packet will be greater than the predetermined threshold and less than a second predetermined threshold, and
in which the transmitting, via a transmitting component, the transmit packet based on the one of the first modulated packet and the second modulated packet includes transmitting the transmit packet based on one of the first modulated packet, the second modulated packet and the third modulated packet.

13. The communication method of claim 12, including:
generating, via a power detecting component, a detected power signal based on an amount of accessible power,
in which the generating, via a controlling component, a control signal to instruct the modulating component to generate the first modulated packet when the transmit packet is less than a predetermined threshold includes generating the control signal to instruct the modulating component to generate one of the first modulated packet or the second modulated packet based on the detected power signal.

14. The communication method of claim 13, including:
receiving, via a receiving component, a communication signal having power information therein based on a second amount of accessible power of a device,
in which the generating, via a controlling component, a control signal to instruct the modulating component to generate the first modulated packet when the data packet is less than a predetermined threshold includes generating the control signal to instruct the modulating component to generate one of the first modulated packet or the second modulated packet based on the communication signal.

15. The communication method of claim 14, in which the transmitting, via a transmitting component, the one of the first modulated packet and the second modulated packet includes transmitting the one of the first modulated packet and the second modulated packet in accordance with one of PRIME, ITU G9903 and IEEE 1901.2.

16. The communication method of claim 11, including:
generating, via a power detecting component, a detected power signal based on an amount of accessible power,
in which the generating, via a controlling component, a control signal to instruct the modulating component to generate the first modulated packet when the data packet is less than a predetermined threshold includes generating the control signal to instruct the modulating component to generate one of the first modulated packet or the second modulated packet based on the detected power signal.

17. The communication method of claim 16, including:
receiving, via a receiving component, a communication signal having power information therein based on a second amount of accessible power of a device,
in which the generating, via a controlling component, a control signal to instruct the modulating component to generate the first modulated packet when the data packet is less than a predetermined threshold includes generating the control signal to instruct the modulating component to generate one of the first modulated packet or the second modulated packet based on the communication signal.

18. The communication method of claim 17, in which the transmitting, via a transmitting component, the one of the first modulated packet and the second modulated packet includes transmitting the one of the first modulated packet and the second modulated packet in accordance with one of PRIME, ITU G9903 and IEEE 1901.2.

19. The communication method of claim 11, including:
receiving, via a receiving component, a communication signal having power information therein based on a second amount of accessible power of a device,
in which the generating, via a controlling component, a control signal to instruct the modulating component to generate the first modulated packet when the data packet is less than a predetermined threshold includes generating the control signal to instruct the modulating component to generate one of the first modulated packet or the second modulated packet based on the communication signal.

20. The communication method of claim 11, in which the transmitting, via a transmitting component, the one of the first modulated packet and the second modulated packet includes transmitting the one of the first modulated packet and the second modulated packet in accordance with one of PRIME, ITU G9903 and IEEE 1901.2.

* * * * *